March 31, 1970     M. J. FRANKLIN ET AL     3,503,788
COCOON CURING OF CONCRETE
Filed Feb. 3, 1967
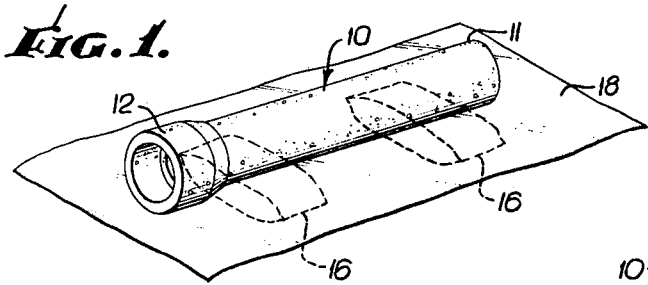
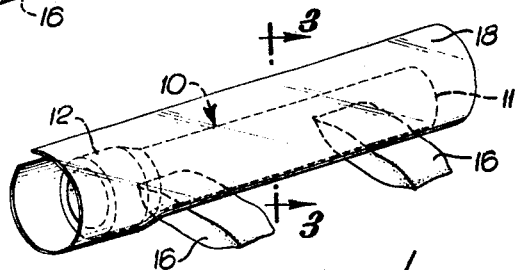
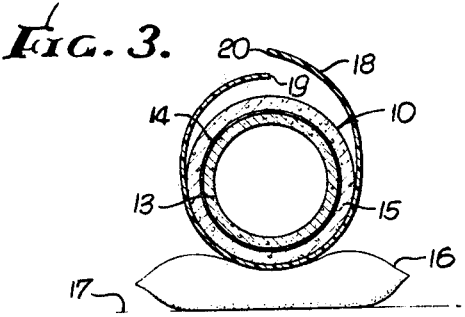
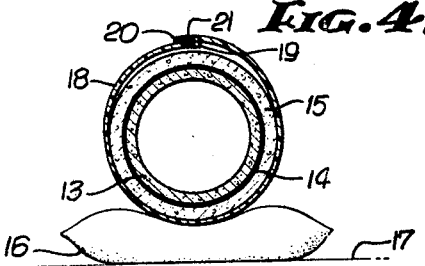
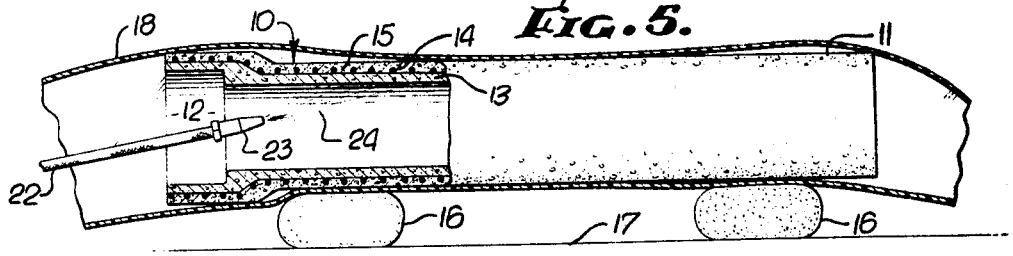
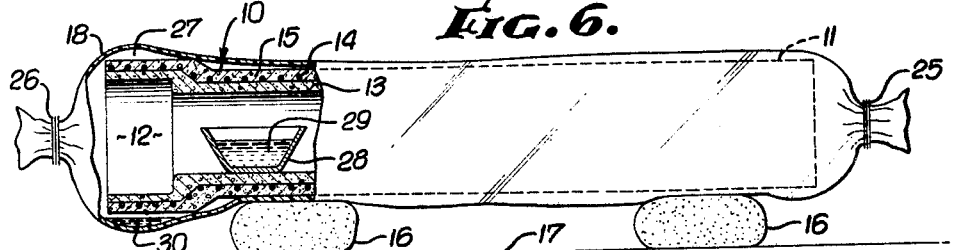
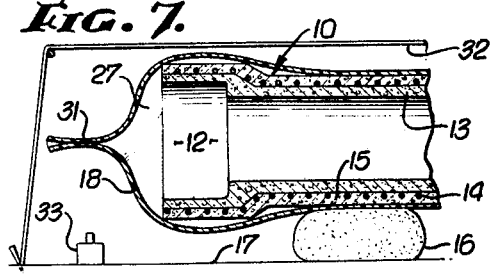
INVENTORS.
MATTHEW JAMES FRANKLIN
CARL W. NEEDHAM
By Beehler & Arant
ATTORNEYS.

United States Patent Office 3,503,788
Patented Mar. 31, 1970

3,503,788
COCOON CURING OF CONCRETE
Matthew J. Franklin and Carl W. Needham, Plainview, Tex., assignors to Raymond International, Inc., New York, N.Y., a corporation of New Jersey
Filed Feb. 3, 1967, Ser. No. 613,845
Int. Cl. B05b *13/06;* F16l *9/14*
U.S. Cl. 117—94
10 Claims

ABSTRACT OF THE DISCLOSURE

Curing a mortar coating on a prestressed concrete pipe by enclosing the pipe in a loosely draped cocoon of moisture impermeable film. A body of liquid water is provided inside the sealed cocoon during the cure to insure the maintenance of high humidity conditions.

---

This invention relates to a moisture curing of concrete pipe. More particularly, the invention relates to a process for moisture curing a freshly applied coating of mortar on the exterior of a pipe and apparatus including the pipe whereby the method can be practiced.

Broadly, the invention comprises a cured prestressed concrete pipe core to which is applied an uncured moist mortar coating. The cured core and the uncured coating together define a pipe. The cured core is moistened with water and a flexible moisture impermeable film is draped loosely around the exterior of the pipe. The film is so compositioned that it completely encloses the pipe and is sealed on itself so as to form a sealed cocoon containing the pipe. Appropriate means is provided inside of the sealed cocoon for maintaining the mortar coating in a moist condition until it reaches a desired predetermined state of cure.

Concrete pipes must be cured in the presence of an abundance of moisture if they are to exhibit the most desirable physical characteristics. In general, at least a 7 day continuous moisture cure is employed.

Heretofore two common methods of moisture curing concrete pipe have been practiced. One method is steam curing and the other water curing. In the steam curing method an enclosure is employed large enough for a number of pipe lengths. Pipes are placed in the enclosure and an atmosphere of steam at an elevated temperature is provided in the enclosure for the period of the cure. When resort is had to water curing, the pipes are dispersed in an open field and overhead water sprays are located above the pipes so that at periodic intervals drops of water rain on the pipes for the period of the continuous cure. The steam curing method is extremely expensive and complex in that structures of appreciable size are required to house the pipe lengths and the steam generating and distributing apparatus. The water cure is not dependable because high winds blow the water away and low temperatures caused it to freeze. Burlap or other moisture absorbent materials are sometimes placed over the pipes to spread the moisture during water curing. Handling of the burlap and maintaining it in the proper position on the pipes makes this process difficult to operate successfully. Considerable quantities of water is consumed in the water cure method as water passes over the pipes and into the soil surrounding the pipes. At the completion of the desired curing period the ground surrounding the pipes is so saturated with water that it is difficult to bring heavy equipment in to move the pipes. As a result the pipes are left where they are until the ground dries out sufficiently to support the necessary equipment. Paving a large surface to prevent this problem is very costly and the paving is difficult to maintain in good condition because of the weight of the piping and heavy equipment moving across it.

These and other disadvantages of the prior art have been overcome by way of the present invention. In the practice of this invention no steam generating equipment is required. The pipe may be placed in an open field exposed to high winds, low humidity and excessive heat without detriment. Humidity is maintained inside the cocoon at a constant value of about 100%. The invention is not subject to mechanical equipment failures during cure such as breakdowns in a steam generator or water pumping system. A small limited amount of water is used when compared with the conventional water curing method and that water which is used is contained within the cocoon and does not escape to saturate the soil beneath. Since the soil is not saturated with water, it is possible to move in heavy equipment for handling the pipe as soon as the cure is complete or, if desired, even during curing. If desired, the curing may even be completed while the pipe is in transit to wherever it is to be used provided care is taken not to tear the cocoon in handling.

It is therefore among the objects of the invention to provide a new and improved method for moisture curing of concrete pipe wherein a complete cure can be achieved by employment of a fixed relatively minimum amount of water.

Another object of the invention is to provide a new and improved apparatus by means of which concrete pipes can be moisture cured in the field without resorting to special structures or special piping to bring water into contact with the pipes.

Still another object of the invention is to provide a new and improved method for the moisture curing of prestressed concrete pipes of large diameter which makes it possible to raise the temperature in the immediate vicinity of the pipe while the moisture curing is taking place without heat needing to be supplied, and apparatus by means of which the method can be practiced.

With these and other objects in view, the invention consists in the construction, arrangement, and combination of the various parts of the device, whereby the objects contemplated are attained, as hereinafter set forth, pointed out in the appended claims and illustrated in the accompanying drawings.

In the drawings:

FIGURE 1 is a perspective of a concrete pipe supported on sandbags on a sheet of film before being enveloped with the film;

FIGURE 2 is a perspective view similar to that shown in FIGURE 1 with the sheet of film drawn around the pipe in the form of an open tube;

FIGURE 3 is a cross sectional view on the line 3—3 of FIGURE 2;

FIGURE 4 is an end elevational view of the pipe shown in FIGURE 2 showing the edges of the film sealed together;

FIGURE 5 is a longitudinal view of the pipe and surrounding film partially in section and including a spray for initially supplying moisture to the interior;

FIGURE 6 is a longitudinal view partially in section of a sealed cocoon containing a pipe and supported on sandbags, with a standing body of water inside the cocoon; and FIGURE 7 is a fragmentary longitudinal sectional view of a pipe and cocoon wherein the end of the cocoon is sealed to itself, and showing a heated enclosure surrounding the cocoon.

In an embodiment of the invention chosen for the purpose of illustration there is shown a concrete coated pipe indicated generally by the reference character 10 having a spigot 11, commonly designated the spigot end, and having a bell 12, commonly designated as the bell end. Pipes to which the method is readily adapted consist of a pre-cured core 13 about which is wound prestressing wire 14 which extends in a spiral from one end to the other and by means of which the core 13 is placed in an initially prestressed condition. A protective mortar coating 15 is applied to the core 13 over the prestress wire 14 covering the prestress wire to an appreciable depth. The method and apparatus here involved are directed to the moisture curing of the mortar coating 15.

As shown particularly in FIGURES 1, 2 and 3 the pipe 10 is positioned approximately in the middle of the flexible moisture impermeable synthetic polymeric film 18 and the pipe and film are supported by sandbags 16—16 on a ground surface 17. In FIGURES 2 and 3 the film 18 is shown rolled into the form of a tube containing the concrete coated pipe 10.

Opposite edges 19 and 20 of the film 18 are shown in FIGURE 4 sealed together to form a seam 21. The sealing may be done by means of a hot iron in order to form a heat seal or, should occasion require, the seal may be accomplished by employment of an adhesive.

As shown in FIGURE 5 the pipe core 15 may then be saturated with water supplied through pipes 22 and dispersed through nozzle 23 in a water spray 24.

In FIGURE 6 there is illustrated partially in cross-section a longitudinal view of what may be termed a cocoon formed by tie 25 at the spigot end 11 and tie 26 at the bell end 12 respectively of film 18. The ties 25 and 26 are made tight by gathering together the open ends of the tube of film and tying them shut with a piece of cord or tape thereby to form a moisture tight chamber 27. To make certain that there is an abundance of moisture in the chamber 27 one or more receptacles 28 may be placed in the interior of core 15. The receptacles 28 are filled with what may be termed a standing body of water 29 before the ends of the tube are tied. A second standing body of water 30 collects in the lower part of the cocoon. Standing body of water 30 may be an accumulation of surplus formed by condensation.

In the fragmentary longitudinal cross-sectional view shown in FIGURE 7 the end of film 18 is closed by an adhesive seal 31.

According to the practice of the present invention as soon as the pipe core has been coated with a mortar coating it is ready for the application of the cure. The pipe with its uncured moist firm coating of mortar is handled with large canvas slings so as not to damage the coating. According to one embodiment the coated pipe is carefully placed upon a large sheet of plastic film which is spread on top of sandbags. The exterior of the concrete pipe is saturated with a fine water mist. A fine water mist is used because a strong spray would wash away the uncured mortar coating. The receptacle 28 of water placed in the interior of the pipe provides excess moisture and the mass of the previously cured concrete core may saturate with water. Moisture from the saturated core helps maintain high humidity in the chamber and also seeps into the mortar coating to aid in the cure. The standing bodies of water and other moisture present help hold the humidity in the cocoon at close to 100% during the entire curing cycle. As heretofore described after the sheet of film is folded over the pipe, the edges are sealed either with a hot iron or by means of an adhesive. The ends of the thus formed tube are then twisted together to form a pigtail and tied to complete the sealing of the cocoon after the moisture has been placed inside. The film coated pipe is then allowed to remain in the most conveniently available storage area until curing is complete.

Should the pipe be one having a mortar coating on the inside to be cured, it can be suspended by a suitable means and a preformed tube of film slipped over the saturated pipe and sealed at the ends.

In ordinary warm weather conditions heat will be accumulated by the film and the pipe contained therein and since the chamber 27 is closed preventing the escape of moisture-laden air, the accumulation of heat with an accompanying rise in temperature will appreciably accelerate and improve the curing of the coating. Under more severe conditions, when the ambient temperature threatens to drop below freezing during a curing cycle, it is possible to control the environment in which the curing is taking place by enclosing the cocoons in some readily preparable enclosure such as a tent 32 and then accumulating hot air from a space heater 33 in the enclosure containing the cocoons. Since the area in which the cocoons are located during the cycle is not saturated from excess moisture, the erection of tents or other enclosures and the operation of space heaters may be readily accomplished. On occasions this technique may also be used to increase the curing rate.

Prestress pipes of the type which lend themselves to the curing process described herein are those disclosed in U.S. Patent No. 3,110,503, issued Nov. 12, 1963 to Stephen R. Hubbard. Mortor coating is applied over the multiple turns of wire which prestresses the core in order to protect the wire from corrosion or other damage.

Although pipes of this kind are customarily built in diameters of as much as six, eight, and ten feet the grout or mortar which is employed as the coating on the prestressed cured concrete pipe core is of such relatively stiff consistency that once it has been applied and trowelled to the desired configuration, in spite of the weight, the resultant pipe may be handled carefully without destroying or damaging the mortar coating. While the mortar coating is uncured, the pipes are preferably handled in large canvas slings or on well padded devices so as to protect the mortar coating. During the curing cycle the pipe and its protective cocoon are preferably supported on some broad yieldable support member such as sandbags. The pipes are preferably supported above ground level so as to facilitate inserting lifting devices under them when the curing is complete. Also circulation of moisture inside the cocoon is enhanced and the possibility of puncturing the cocoon is reduced when the cocoon is supported at only one or two areas along its length.

The film which is formed into the cocoon is a flexible moisture impermeable material such as polyethylene, high tensile strength impregnated papers and the like. Synthetic polymeric film is preferred because of its resistance to puncture and tearing and ready availability in such large sizes that an entire cocoon may be made from one sheet. In general such films are slightly permeable to moisture but the amount of moisture escaping from the cocoon is such that this slight permeability is considered to be of no consequence in the practice of this invention. A considerable heat advantage, particular in dry sunny areas, may be secured by employing a black film.

The film may be applied to the pipe by wrapping it around the pipe, in the case of sheets, or by pulling a tube or sock of the film over the pipe. The film is sealed around the pipe in the form of a cocoon by heat sealing, adhesive, cord ties, adhesive tape and the like. The resultant cocoon is supported by the pipe and has approximately the same configuration as the exterior of the pipe with sufficient looseness or drape to allow circulation of the moisture inside the cocoon. Circulation of the moisture enhances the evenness of the cure and also assures that an adequate moisture cure will be obtained even in those areas where some small pin hole or tear may appear in the film. Water is provided in the interior of the cocoon in an amount sufficient to maintain the mortar coating in a moist condition throughout the entire curing cycle. In general some reservoir or standing body of water is required since moisture is taken up by the coating during the curing cycle. Soaking the core of the pipe with water considerably enhances the evenness of the cure of the mortar coating. The space heater which is used in the tent, plastic bubble or other warming enclosure may conveniently be of the gas or electrical radiant type.

What is claimed is:

1. Process for moisture curing a freshly applied coating of mortar on a precured concrete core which comprises:
   applying a moist uncured coating of mortar to the surface of a cured core, said core and said coating together defining a composite structure;
   moistening said core;
   sealing said structure with said uncured coating and moistened core in a cocoon formed by a flexible moisture impermeable film draped loosely around, next adjacent to and completely enclosing said structure; and
   providing a surplus of moisture inside said cocoon to maintain said coating in a moist condition until said mortar reaches a predetermined state of cure.

2. The process of claim 1 including:
   positioning said structure on a single sheet of flexible moisture impermeable synthetic polymeric film;
   wrapping said sheet loosely around said structure; and
   sealing said sheet to itself to form said cocoon.

3. The process of claim 1 including:
   positioning a tube of flexible moisture impermeable synthetic polymeric film loosely around said structure;
   sealing the ends of said tube together to form said cocoon.

4. The process of claim 1 including:
   providing a heat source to maintain the temperature of said coating of mortar above the freezing point of water until said predetermined state of cure is reached.

5. The combination comprising:
   a cured, moist, prestressed concrete pipe core;
   an uncured, preformed, moist mortar coating adhered to the exterior surface of said core, said core and said coating together defining a pipe;
   a flexible moisture impermeable film next adjacent to the exterior surface of said coating, said film being draped loosely around and completely enclosing said pipe to define a sealed cocoon, said cocoon being supported by and in direct contact with the exterior surface of said pipe; and
   means inside said cocoon for maintaining said coating moist.

6. The combination of claim 5 wherein said film is black synthetic polymeric material.

7. The combination of claim 5 wherein said sealed cocoon containing said pipe is supported above ground level on broad yieldable supports.

8. The combination of claim 5 including means for maintaining the temperature of said uncured coating above the freezing point of water.

9. The combination of claim 5 wherein said means for maintaining said coating moist includes a standing body of water inside said sealed cocoon.

10. The combination which comprises:
    a concrete coated composite structure comprising a prestressed cylindrical concrete core having an uncured preformed coating of mortar on the exterior of said core;
    a sealed cocoon having approximately the same proportions and being slightly larger than said structure, said structure being completely enclosed in said sealed cocoon; said cocoon comprising a flexible moisture impermeable synthetic polymeric film draped loosely around said structure;
    a plurality of yieldable support members suporting said sealed cocoon containing said structure; and
    a source of moisture including a standing body of water inside said sealed cocoon.

References Cited

UNITED STATES PATENTS 1,909,177  5/1933  Honegger.
2,639,731  5/1953  Whiting _____ 138—144

ALFRED L. LEAVITT, Primary Examiner

CHARLES R. WILSON, Assistant Examiner

U.S. Cl. X.R.

138—145, 176